April 4, 1950  F. S. CHAPLIN  2,502,703
VEHICLE BODY CONSTRUCTION
Filed March 6, 1946  2 Sheets-Sheet 1
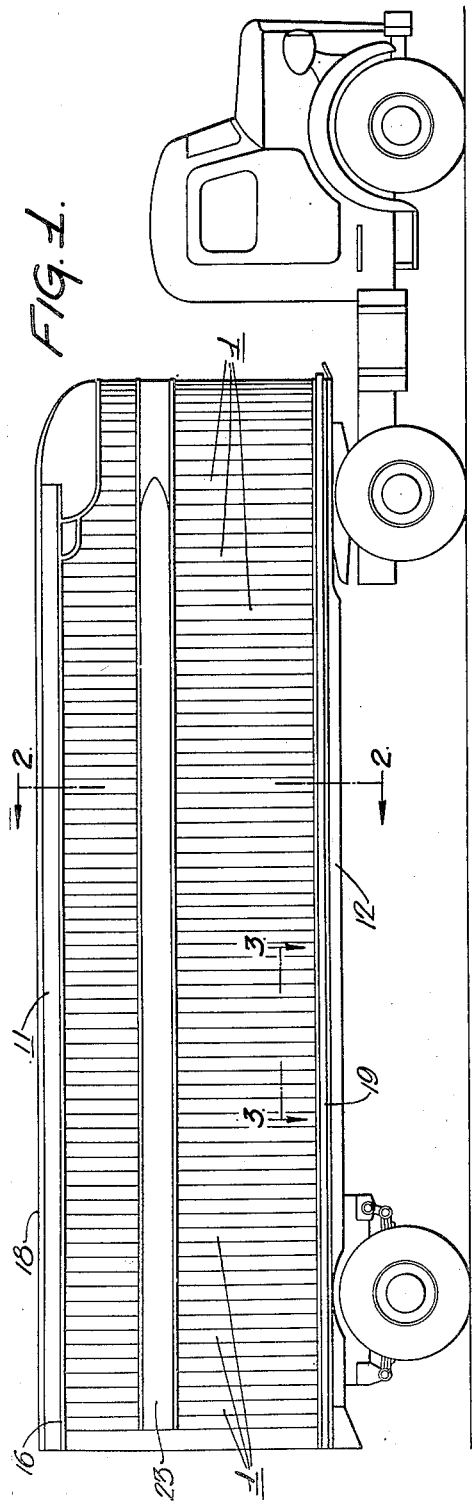
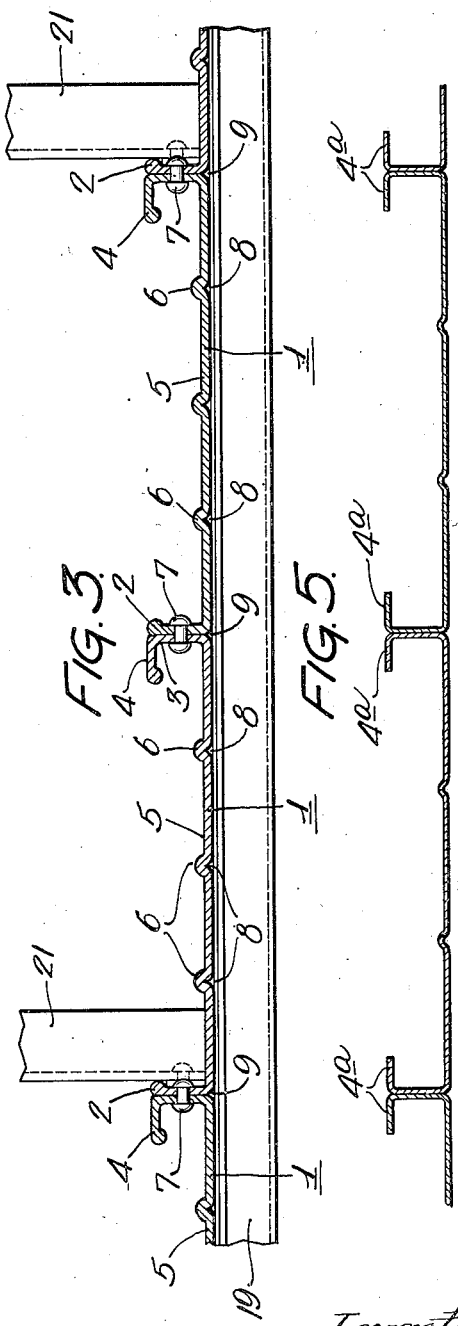
Inventor:
Frank S. Chaplin
by his Attorneys
Howson & Howson

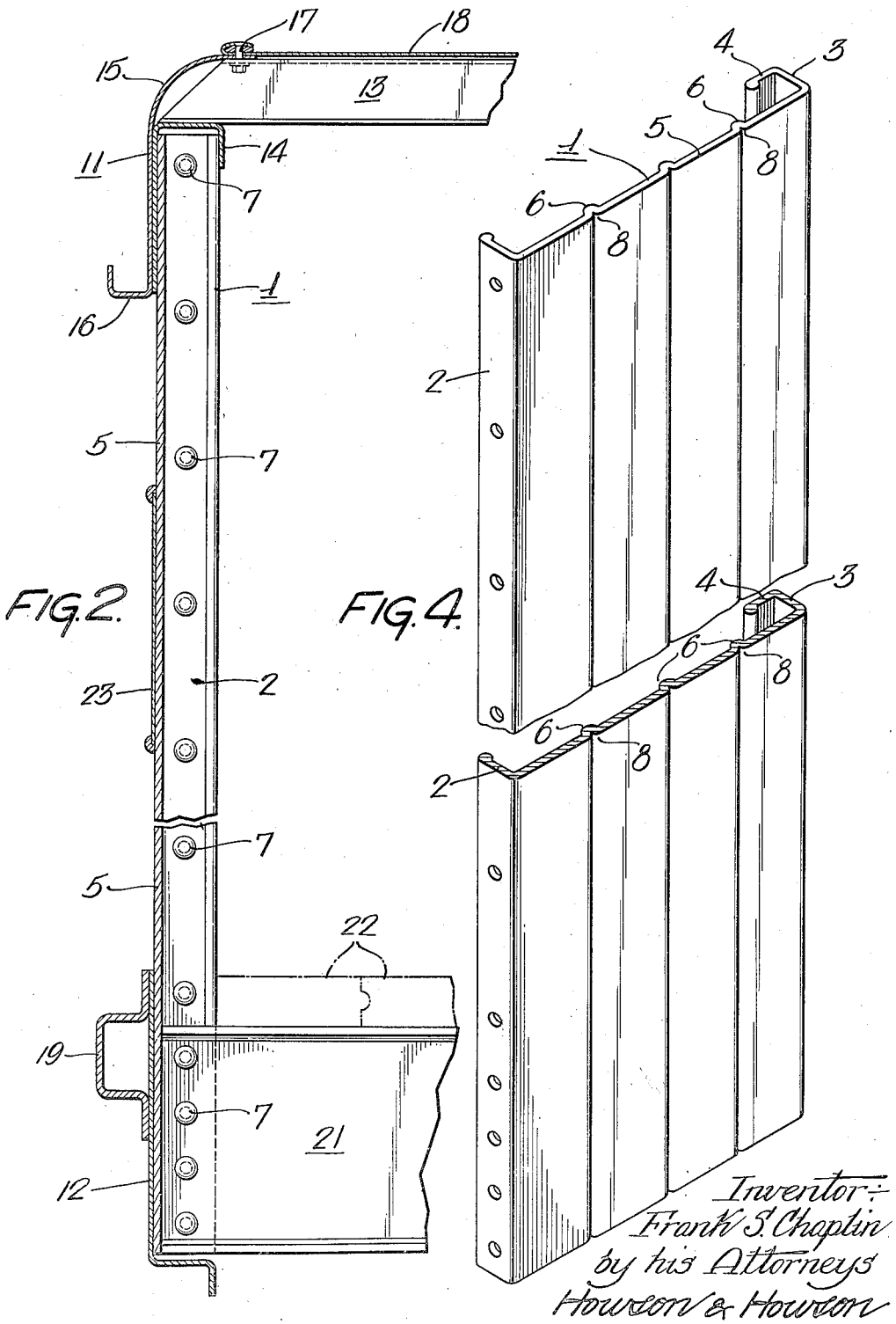

Patented Apr. 4, 1950

2,502,703

UNITED STATES PATENT OFFICE 2,502,703

VEHICLE BODY CONSTRUCTION

Frank S. Chaplin, Erdenheim, Pa.

Application March 6, 1946, Serial No. 652,312

5 Claims. (Cl. 296—28)

This invention relates to improvements in vehicle construction and more particularly in the construction of vehicles such for example as trucks, trailers and the like, and also rail vehicles.

A principal object of the invention is to provide a generally improved construction characterized by simplicity of form and assembly, and lightness of weight coupled with high load-carrying capacity and ruggedness.

Another object of the invention is to provide a novel structural system employing standardized structural elements adapted to function both as frame and sheathing members.

Still another object of the invention is to provide a structural system of the aforesaid character wherein the said elements are individually removable from the assembly for replacement or repair with a minimum disruption of the structure as a whole.

Still another object of the invention is to provide a novel structural system affording a high degree of flexibility as to the size of the vehicle body and as to the size and locations of the doors giving access to the interior of said body.

The invention further resides in certain novel structural details and arrangements hereinafter described and illustrated in the attached drawings wherein:

Fig. 1 is a side view of a trailer truck made in accordance with the invention;

Fig. 2 is a fragmentary sectionary view on the line 2—2, Fig. 1;

Fig. 3 is a sectional view on the line 3—3, Fig. 1;

Fig. 4 is a view in perspective of one of the structural elements, and

Fig. 5 is a fragmentary sectional view corresponding to Fig. 3 and illustrating a modification within the scope of the invention.

With reference to the drawings, a trailer made in accordance with my invention presents a more or less conventional external appearance as illustrated in Fig. 1. Contrary to the conventional practice, however, the body is composed essentially of a plurality of structural elements which may take the form, for example, of that illustrated in Figs. 3 and 4 which are adapted to be assembled, as hereinafter described, with top and bottom rail and associated elements to produce the vehicle body. The said structural elements, which are designated by the reference numeral 1, may be of channel formation as illustrated with rearwardly extending flanges 2 and 3 at the longitudinal edges, the flange 3 in the present instance having an extension 4 which extends inwardly from the outer edge of the flange 3 in a plane parallel to the plane of the web 5 of the channel. In the present instance the channel illustrated is adapted for production by extrusion methods from aluminum alloy or other extrudable and preferably light weight metal, and the more extended web portion 5 of the channel is provided for purposes of strength with reinforcing ribs 6.

The elements 1 are adapted to be secured together in series arrangement by means of rivets 7 which pass through and secure together the flanges 2 and 3 of the adjoining elements, as best shown in Fig. 3. When thus secured together, the elements form a continuous wall structure presenting as a matter of appearance, a continuous outer surface. In this respect it is noted that the web 5 is formed exteriorly at each of the ribs 6 with a longitudinal groove 8 which in appearance matches the grooves 9 at the junctures of the contiguous elements, and the recesses 8 are spaced uniformly with respect to each other, and to the recesses 9 so as to afford a uniform external appearance wherein the joints between the adjoining sections are indistinguishable from the recesses 8.

The structure further comprises a top rail 11 and a bottom rail 12. The top rail 11 forms a support for the roof structure consisting of a series of transverse inverted U-beams 13, which span the top of the vehicle body, and a roof panel 18. The rail comprises an inverted channel 14 which forms a seat for the ends of the beams 13, and the channel also receives the upper ends of the elements 1 as best shown in Fig. 2. Thus the upper edge of the channel assembly composed of the elements 1 is, in effect, interlocked with the channel 14, and the entire roof structure may be secured to the wall by bolts or rivets passed through the inner flange of the channel 14 and the adjoined flanges of the elements 1. The rail 11 also comprises an outer portion 15 which forms the rounded top corner of the vehicle body and which extends downwardly to form a gutter 16 for collecting and carrying away the roof drainage. The upper edge of the portion 15 may be secured to the top flanges of the channels 13 by means of bolts 17 and these bolts may also retain the roof panel 18.

The lower ends of the elements 1 are attached to the bottom rail 12, as, for example, by rivets. This rail, shaped preferably as shown in Fig. 2, also includes a projecting channel member 19 which not only adds strength to the rail but functions also as a scuffler rail for the vehicle body.

It is to be noted that the elements 1 are attached rigidly both to the top and bottom rails, and that the said elements, with said rails, form the load-carrying girders of the vehicle body.

The floor beams 21 of the vehicle, in the form of the present instance of channels, are attached directly to the lower ends of the elements 1, and this connection may be established by the same rivets which secure the said elements together. The floor boards will then extend longitudinally of the body and will be bolted or otherwise secured to the beams 21.

If it becomes necessary to remove one or more of the elements 1 for repair or replacement, it is only necessary to cut away the rivets or remove the bolts which secure the said element or elements in the assembly, to remove also any of the floor boards 22 and beams 21 which may interfere, and thereafter to displace the lower ends of the said element or elements inwardly to an extent clearing the bottom rail 12 and permitting withdrawal downwardly of said element to free the upper end thereof from the channel 14. The upper end of the said element may then be passed out under the top rail and the entire element withdrawn upwardly and outwardly from the structure while otherwise the structure remains intact. The same elements, or replacements, may be reinserted in the structure in reverse manner and, with the other disconnected parts, be secured in place as before.

In the trailer body shown in Fig. 1, the front of the body is rounded, and this desirable form will involve the use in the curved section of a number of the elements 1 having their flanges 2 and 3 directed inwardly so as to converge toward the center of the arc. Also illustrated in Fig. 1 is band 23 which in the present instance extends completely around the wall of the body and embraces the elements 1 in an area between the top and bottom rails. This band acts to reinforce the wall against pressures tending to bulge them outwardly, and may function also to frame a name plate.

It will be noted that in the aforedescribed construction, elements of the load-carrying structure, namely, the elements 1, constitute also the exterior sheathing of the body. The construction, wherein the elements 1 are secured together by way of the internal flanges, affords an outer sheathing surface unbroken by bolts or other visible means of connection. This type of construction also permits ready adjustment of the length of the structure by varying the number of the elements 1, and also affords wide latitude as to location and width of side doors formed by omission of a number of the elements 1 and simple reinforcement of the top and bottom rails immediately above and below the door opening. As stated above, the use of load carrying posts as sections of sheathing also provides for easy replacement of parts in a local damage area.

The aforedescribed construction is subject to modification without departure from the invention. In Fig. 5, for example, I have illustrated a post-panel element of the character described above, but made in this instance of sheet metal as a rolled or pressed section. In this case I prefer to have an inturned flange 4a at each end of the post element, and where these elements are attached to the floor beams, one or other of the flanges 4a may be deleted.

I claim:

1. In a vehicle body, a side wall structure consisting of a plurality of upright post elements assembled in side-abutting relation so as to afford a continuous wall surface, said post elements being in the form of channels with inwardly facing side flanges, securing means connecting the flanges of each post element to the respective proximal flanges of the adjoining post elements thereby to join the said post elements together into a unitary wall structure, transverse load-supporting beam elements, and securing means connecting the ends of said beam elements to the said inturned flanges at the lower ends of certain of the post elements and forming rigid joints between said post and beam elements, said post element assembly constituting both the sheathing and the primary load-supporting framework of said body to which the full shear loading of the beams is directly transmitted through said joints.

2. A vehicle body according to claim 1 wherein the transverse beams are in the form of channels, the body web of each of said channel beams being secured to a side of one of said flanges.

3. A vehicle body according to claim 1 wherein the side wall structure includes rails detachably secured against the outside of the component post elements and extending along the top and bottom of said structure respectively.

4. A vehicle body according to claim 3 wherein a roof structure is supported on the top rail.

5. A vehicle body according to claim 1 wherein the free edge portion of one of the inturned side flanges of each of the post elements is turned laterally substantially into parallelism with the web of the channel so that the flange is substantially L-shaped in cross-section, and the other flange of each of the posts being straight and being secured to the L-shaped flange of the adjoining post element.

FRANK S. CHAPLIN.

REFERENCES CITED

The following references are of record in the file of this patent:

UNITED STATES PATENTS

| Number | Name | Date |
|---|---|---|
| 432,275 | Harvey | July 15, 1890 |
| 648,633 | Rapley | May 1, 1900 |
| 728,044 | Summers | May 12, 1903 |
| 756,707 | Rapley | Apr. 5, 1904 |
| 926,416 | Hopkins | June 29, 1909 |
| 1,530,570 | Moores et al. | Mar. 24, 1925 |
| 1,579,673 | Tench et al. | Apr. 6, 1926 |
| 1,813,537 | Gilpin | July 7, 1931 |
| 2,029,756 | Davis, Jr. | Feb. 4, 1936 |
| 2,100,323 | Fitch | Nov. 30, 1937 |
| 2,101,344 | Reynolds | Dec. 7, 1937 |
| 2,179,600 | Rice | Nov. 14, 1939 |
| 2,363,170 | Fontaine | Nov. 21, 1944 |
| 2,384,965 | Reid | Sept. 18, 1945 |
| 2,400,253 | Ostlund | May 14, 1946 |

FOREIGN PATENTS

| Number | Country | Date |
|---|---|---|
| 307,860 | Great Britain | Mar. 15, 1929 |
| 794,092 | France | Dec. 2, 1935 |